United States Patent
Zhou

(10) Patent No.: US 10,462,258 B2
(45) Date of Patent: Oct. 29, 2019

(54) RESOURCE DOWNLOAD METHOD, ELECTRONIC DEVICE, AND APPARATUS

(71) Applicant: Huawei Technologies Co., Ltd., Shenzhen (CN)

(72) Inventor: Tao Zhou, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 209 days.

(21) Appl. No.: 15/503,126

(22) PCT Filed: Aug. 27, 2014

(86) PCT No.: PCT/CN2014/085306
§ 371 (c)(1),
(2) Date: Feb. 10, 2017

(87) PCT Pub. No.: WO2016/029384
PCT Pub. Date: Mar. 3, 2016

(65) Prior Publication Data
US 2017/0237825 A1    Aug. 17, 2017

(51) Int. Cl.
*H04L 29/08* (2006.01)
*H04L 29/06* (2006.01)

(52) U.S. Cl.
CPC ............. *H04L 67/32* (2013.01); *H04L 67/02* (2013.01); *H04L 67/2842* (2013.01); *H04L 67/325* (2013.01); *H04L 67/42* (2013.01)

(58) Field of Classification Search
CPC ......... H04L 67/00; H04L 67/02; H04L 67/04; H04L 67/06; H04L 67/28; H04L 67/2819;
(Continued)

(56) References Cited

U.S. PATENT DOCUMENTS 6,389,422 B1 * 5/2002 Doi .................. G06F 17/30132
707/758
6,421,733 B1 * 7/2002 Tso .................. G06F 17/30905
358/402
(Continued)

FOREIGN PATENT DOCUMENTS

CN         1909461 A      2/2007
CN         101442558 A    5/2009
(Continued)

OTHER PUBLICATIONS

Machine Translation and Abstract of Chinese Publication No. CN101442558, May 27, 2009, 10 pages.
(Continued)

*Primary Examiner* — Tauqir Hussain
*Assistant Examiner* — Boris D Grijalva Lobos
(74) *Attorney, Agent, or Firm* — Conley Rose, P.C.

(57) ABSTRACT

A resource download method, an electronic device, and an apparatus, where the resource download method includes initiating a first request to a server, receiving a packet generated by the server based on the first request and returned by the server, where the packet includes an entity data part corresponding to the first request, writing a download resource into a first storage area of the electronic device when the entity data part of the packet is the download resource, reading the download resource from the first storage area, and storing the download resource into a second storage area of the electronic device.

15 Claims, 5 Drawing Sheets

(58) Field of Classification Search
CPC . H04L 67/2833; H04L 67/2842; H04L 67/32; H04L 67/325; H04L 67/327; H04L 67/42; G06F 15/00; G06F 15/16
See application file for complete search history.

(56) References Cited

U.S. PATENT DOCUMENTS

| | | | | |
|---|---|---|---|---|
| 6,684,088 | B1* | 1/2004 | Halahmi | G06Q 10/107 455/412.1 |
| 6,813,690 | B1* | 11/2004 | Lango | G06F 12/0866 707/999.103 |
| 6,915,307 | B1* | 7/2005 | Mattis | G06F 17/30067 |
| 7,359,956 | B2* | 4/2008 | Kanai | H04L 29/06 341/51 |
| 7,640,347 | B1* | 12/2009 | Sloat | H04L 67/2842 709/203 |
| 7,644,149 | B2* | 1/2010 | Van Geest | H04L 67/34 709/223 |
| 7,774,499 | B1* | 8/2010 | Popek | H04L 67/2804 709/217 |
| 9,075,893 | B1* | 7/2015 | Jenkins | G06F 17/30902 |
| 9,104,582 | B1* | 8/2015 | Mukundan | G06F 12/0893 |
| 9,756,108 | B2* | 9/2017 | Jain | H04L 67/02 |
| 2001/0003828 | A1* | 6/2001 | Peterson | H04L 67/2847 709/219 |
| 2001/0056444 | A1* | 12/2001 | Ide | G06F 17/30905 715/234 |
| 2002/0099783 | A1* | 7/2002 | Mizuyama | H04M 1/72525 709/208 |
| 2002/0118389 | A1* | 8/2002 | Fukuda | H04L 67/1008 358/1.15 |
| 2003/0061337 | A1* | 3/2003 | Sato | H04L 67/2819 709/223 |
| 2003/0110272 | A1* | 6/2003 | Du Castel | H04L 29/06 709/229 |
| 2004/0181609 | A1* | 9/2004 | Ullmann | H04L 67/02 709/245 |
| 2007/0239857 | A1* | 10/2007 | Mahalal | H04L 63/083 709/219 |
| 2007/0271239 | A1 | 11/2007 | Zhang et al. | |
| 2008/0016177 | A1* | 1/2008 | Jin | G06F 17/30864 709/217 |
| 2010/0191805 | A1* | 7/2010 | Lu | H04L 67/2842 709/203 |
| 2010/0250838 | A1* | 9/2010 | Englbrecht | G06F 12/0888 711/103 |
| 2011/0167101 | A1 | 7/2011 | Hopen et al. | |
| 2013/0173695 | A1 | 7/2013 | Arsenault | |
| 2013/0179946 | A1* | 7/2013 | Bishop | H04L 67/42 726/4 |
| 2013/0290465 | A1* | 10/2013 | Harrison | G06F 17/30902 709/213 |
| 2014/0143371 | A1* | 5/2014 | Sandhu | G06F 17/30899 709/213 |
| 2014/0223099 | A1* | 8/2014 | Kidron | G06F 12/0806 711/118 |
| 2016/0196131 | A1* | 7/2016 | Searle | H04L 41/082 717/173 |

FOREIGN PATENT DOCUMENTS

| | | |
|---|---|---|
| CN | 101729581 A | 6/2010 |
| CN | 102857514 A | 1/2013 |
| WO | 2010048803 A1 | 5/2010 |

OTHER PUBLICATIONS

Machine Translation and Abstract of Chinese Publication No. CN102857514, Jan. 2, 2013, 10 pages.
Machine Translation and Abstract of International Publication No. WO2010048803, May 6, 2010, 22 pages.
Foreign Communication From a Counterpart Application, PCT Application No. PCT/CN2014/085306, English Translation of International Search Report dated May 29, 2015, 2 pages.
Foreign Communication From a Counterpart Application, PCT Application No. PCT/CN2014/085306, English Translation of Written Opinion dated May 29, 2015, 6 pages.
Machine Translation and Abstract of Chinese Publication No. CN101729581, Jun. 9, 2010, 28 pages.
Foreign Communication From a Counterpart Application, Chinese Application No. 201480046734.1, Chinese Office Action dated Feb. 9, 2018, 5 pages.

* cited by examiner

RESOURCE DOWNLOAD METHOD, ELECTRONIC DEVICE, AND APPARATUS

CROSS-REFERENCE TO RELATED APPLICATIONS

This application is a U.S. national stage of International Patent Application No. PCT/CN2014/085306 filed on August 27, 2014, which is hereby incorporated by reference in its entirety.

TECHNICAL FIELD

The present disclosure relates to the field of electronic technologies, and in particular, to a resource download method, an electronic device, and an apparatus.

BACKGROUND

Currently, an ANDROID package (APK) named DownloadProvider, which is a download manager is built in an ANDROID system, and is used to download a resource such as audio, a video, text, and an installation package.

After a user enters a website address in a client (such as a browser), the client sends a GET request to a server based on the Hypertext transfer protocol (HTTP), to obtain data from a network. The GET request method requests the server to put, into an entity data part of a packet, a resource located using a uniform resource locator (URL), to return to the client. When receiving packet header information of the packet, the client parses the packet header information to determine whether the resource requested by the GET request is a download resource or a resource in another form, such as a web page, that is, determine whether the entity data part of the packet is a download resource or a resource in another form, such as a web page resource. When the entity data part is a download resource, the client stops resource loading, and writes a download link address of the download resource into a download record database corresponding to DownloadProvider. After detecting a download request in the download record database, DownloadProvider retrieves the to-be-downloaded record, and DownloadProvider sends a GET request to the server according to the download link address in the download record. The server responds to the GET request of DownloadProvider, and the server puts the download resource into the entity data part to return to DownloadProvider. DownloadProvider parses the packet header information to determine whether the resource requested by the GET request is a download resource when receiving the packet header information. The download resource is directly downloaded from the server to a storage area using DownloadProvider if the resource is a download resource.

It can be learned that, in some other approaches, if a resource is downloaded using a request that is sent by a client and that is used to obtain a download resource, two GET requests need to be initiated to a server in an entire process in which the client requests to download the resource, and the server needs to make two responses to an electronic device, where at least packet header information needs to be returned in the two responses, to determine whether the requested resource is a download resource. The two GET requests and the two responses cause problems of increased network load and a traffic waste.

SUMMARY

Embodiments of the present disclosure provide a resource download method, an electronic device, and an apparatus, which are used to resolve technical problems of increased network load and a traffic waste.

According to a first aspect, an embodiment of the present disclosure provides a resource download method, where the method is applied to an electronic device, and includes initiating, by a client module in the electronic device, a first request to a server, receiving, by the client module, a packet that is generated by the server based on the first request and that is returned by the server, where the packet includes an entity data part corresponding to the first request, writing, by the client module, the download resource into a first storage area of the electronic device when the entity data part of the packet is a download resource, notifying, by the client module, a download management module in the electronic device, reading, by the download management module, the download resource from the first storage area, and storing the download resource into a second storage area of the electronic device.

With reference to the first aspect, in a first possible implementation manner, the electronic device further includes a cache service module, writing, by the client module, the download resource into a first storage area of the electronic device includes writing, by the client module, the download resource into the first storage area using the cache service module, and reading, by the download management module, the download resource from the first storage area, and storing the download resource into a second storage area of the electronic device includes reading, by the download management module, the download resource from the first storage area using the cache service module, and storing, by the download management module, the download resource into the second storage area.

With reference to the first possible implementation manner of the first aspect, in a second possible implementation manner, the packet further includes packet header information, and writing, by the client module, the download resource into the first storage area using the cache service module includes determining whether the entity data part is a download resource according to the packet header information when the client module receives the packet header information, receiving, by the client module, the entity data part when the entity data part is a download resource, and writing, by the client module, data of the received entity data part into the first storage area using the cache service module such that the client module writes the download resource into the first storage area.

With reference to the second possible implementation manner of the first aspect, in a third possible implementation manner, notifying, by the client module, a download management module in the electronic device includes generating, by the client module, first identification information according to the packet header information and a URL of the download resource, and writing, by the client module, the first identification information into a download record database associated with the download management module, where the first identification information is used by the download management module to obtain a download request corresponding to the download resource.

With reference to the third possible implementation manner of the first aspect, in a fourth possible implementation manner, reading, by the download management module, the download resource from the first storage area using the cache service module includes responding to, by the download management module, the download request, and querying, in the cache service module, identification information that matches the first identification information, where the download resource is indexed in the cache service module using second identification information, and reading, from the first storage area by the download management module using the cache service module, the download resource corresponding to the second identification information when finding the second identification information that matches the first identification information.

With reference to the fourth possible implementation manner of the first aspect, in a fifth possible implementation manner, after writing, by the client module, the first identification information into a download record database associated with the download management module, the method further includes determining the URL from the first identification information when the download management module fails to find, in the cache service module, the identification information that matches the first identification information, where the URL is used by the server to obtain the download resource, and sending, by the download management module according to the URL, a second request to the server, where the second request requests the server to return the download resource to the download management module.

According to a second aspect, an embodiment of the present disclosure provides an electronic device, including a first sending unit configured to control a client module in the electronic device to initiate a first request to a server, a receiving unit configured to control the client module to receive a packet that is generated by the server based on the first request and that is returned by the server, where the packet includes an entity data part corresponding to the first request, a write unit configured to control the client module to write the download resource into a first storage area of the electronic device when the entity data part of the packet is a download resource, and a read unit configured to control the client module to notify a download management module in the electronic device, and control the download management module to read the download resource from the first storage area and store the download resource into a second storage area of the electronic device.

With reference to the second aspect, in a first possible implementation manner, when the electronic device further includes a cache service module, the write unit is configured to control the client module to write, using the cache service module, the download resource into the first storage area, and the read unit is configured to control the download management module to read, using the cache service module, the download resource from the first storage area, and control the download management module to store the download resource into the second storage area.

With reference to the first possible implementation manner of the second aspect, in a second possible implementation manner, the packet further includes packet header information, and the write unit is configured to determine whether the entity data part is a download resource according to the packet header information when the client module receives the packet header information, control the client module to receive the entity data part when determining that the entity data part is a download resource, and control the client module to write, using the cache service module, data of the received entity data part into the first storage area such that the client module writes the download resource into the first storage area.

With reference to the second possible implementation manner of the second aspect, in a third possible implementation manner, the write unit is further configured to control the client module to generate, according to the packet header information and a URL of the download resource, first identification information, and control the client module to write the first identification information into a download record database associated with the download management module, where the first identification information is used by the download management module to obtain a download request corresponding to the download resource.

With reference to the third possible implementation manner of the second aspect, in a fourth possible implementation manner, the read unit is configured to control the download management module to respond to the download request, and query, in the cache service module, identification information that matches the first identification information, where the download resource is indexed in the cache service module using second identification information, and control the download management module to read, from the first storage area using the cache service module, the download resource corresponding to the second identification information when the download management module finds the second identification information that matches the first identification information.

With reference to the fourth possible implementation manner of the second aspect, in a fifth possible implementation manner, the electronic device further includes a determining unit configured to determine the URL from the first identification information when the download management module fails to find, in the cache service module, the identification information that matches the first identification information, where the URL is used by the server to obtain the download resource, and a second sending unit configured to control the download management module to send, according to the URL, a second request to the server, where the second request is used to request the server to return the download resource to the download management module.

According to a third aspect, an embodiment of the present disclosure provides an electronic device, including a transceiver, an input apparatus, and a processor, where the processor is configured to control a client module in the electronic device to initiate a first request to a server, receive a packet that is generated by the server based on the first request and that is returned by the server, where the packet includes an entity data part corresponding to the first request, write the download resource into a first storage area of the electronic device when the entity data part of the packet is a download resource, and notify a download management module in the electronic device, and the processor is further configured to control the download management module to read the download resource from the first storage area and store the download resource into a second storage area of the electronic device.

With reference to the third aspect, in a first possible implementation manner, when the electronic device further includes a cache service module, the processor is configured to control the client module to write, using the cache service module, the download resource into the first storage area, and the processor is configured to control the download management module to read, using the cache service module, the download resource from the first storage area, and store the download resource into the second storage area.

With reference to the first possible implementation manner of the third aspect, in a second possible implementation manner, the packet further includes packet header information, and the processor is further configured to control the client module to determine, according to the packet header information, whether the entity data part is a download resource when receiving the packet header information, receive the entity data part when the entity data part is a download resource, and write, using the cache service module, data of the received entity data part into the first storage area such that the client module writes the download resource into the first storage area.

With reference to the second possible implementation manner of the third aspect, in a third possible implementation manner, the processor is configured to control the client to generate first identification information according to the packet header information and a URL of the download resource, and write the first identification information into a download record database associated with the download management module, where the first identification information is used by the download management module to obtain a download request corresponding to the download resource.

With reference to the third possible implementation manner of the third aspect, in a fourth possible implementation manner, the processor is configured to control the download management module to respond to the download request, and query, in the cache service module, identification information that matches the first identification information, where the download resource is indexed in the cache service module using second identification information, and read, from the first storage area using the cache service module, the download resource corresponding to the second identification information when finding the second identification information that matches the first identification information.

With reference to the fourth possible implementation manner of the third aspect, in a fifth possible implementation manner, the processor is further configured to control the download management module to determine the URL from the first identification information when the download management module fails to find, in the cache service module, the identification information that matches the first identification information, where the URL is used by the server to obtain the download resource, and send, according to the URL, a second request to the server, where the second request is used to request the server to return the download resource to the download management module.

Technical solutions provided in the embodiments of the present disclosure have at least the following technical effects or advantages.

A technical means is used, where a client module in an electronic device initiates a first request to a server. The client module receives a packet that is generated by the server based on the first request and that is returned by the server, where the packet includes an entity data part corresponding to the first request. The client module writes the download resource into a first storage area of the electronic device when the entity data part of the packet is a download resource. The client module notifies a download management module in the electronic device, and the download management module reads the download resource from the first storage area, and stores the download resource into a second storage area of the electronic device. It can been seen that, in the present disclosure, data returned by the server is stored into the first storage area, and the download management module is instructed to retrieve the required entity data part from the first storage area, to implement download of the download resource into the second storage area. During an entire download process, the electronic device only needs to initiate one request to the server, and the server can obtain the download resource by making only one response. Therefore, network load is reduced, and a problem of a traffic waste is avoided.

DESCRIPTION OF EMBODIMENTS

Embodiments of the present disclosure provide a resource download method, an electronic device, and an apparatus to resolve technical problems of increased network load and a traffic waste that are caused by the resource download.

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

In the following, preferred implementation manners of the present disclosure are described in detail with reference to the accompanying drawings.

Figure 1:
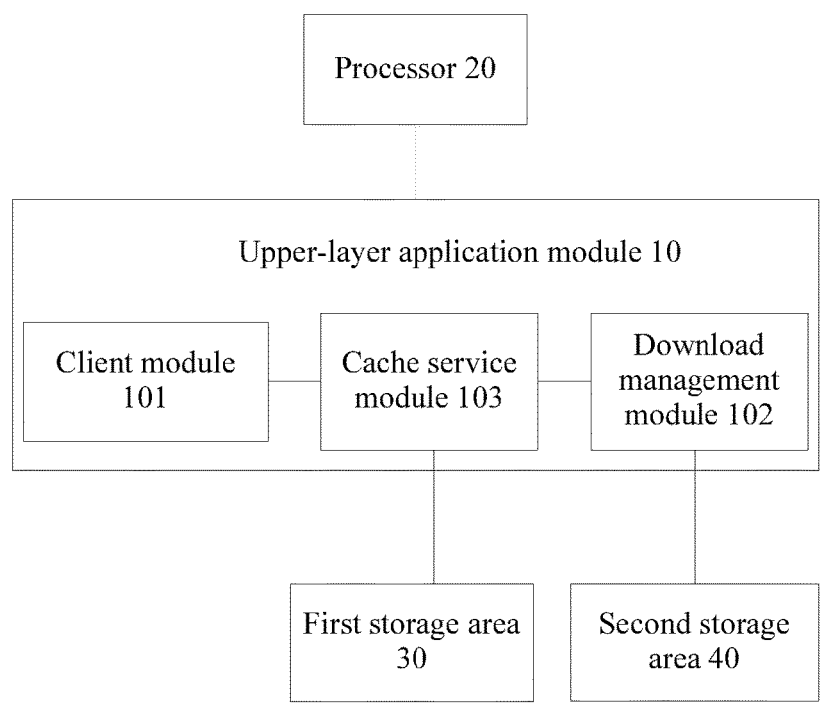
FIG. 1 is an architecture diagram of an electronic device according to an embodiment of the present disclosure.

As shown in FIG. 1, FIG. 1 is an architecture diagram of an electronic device according to an embodiment of the present disclosure, where the electronic device includes an upper-layer application module 10, a processor 20 that supports the upper-layer application module 10, a first storage area 30, and a second storage area 40. Further, the upper-layer application module 10 includes a client module 101, a download management module 102, and a cache service module 103. Further, the client module 101 may be a browser module, an instant messaging module, and the like. The electronic device may be an ANDROID system-based electronic device, such as an ANDROID smartphone and an ANDROID tablet computer. However, a procedure provided in this embodiment of the present disclosure is applied not only to the electronic device of an ANDROID system.

Figure 2:
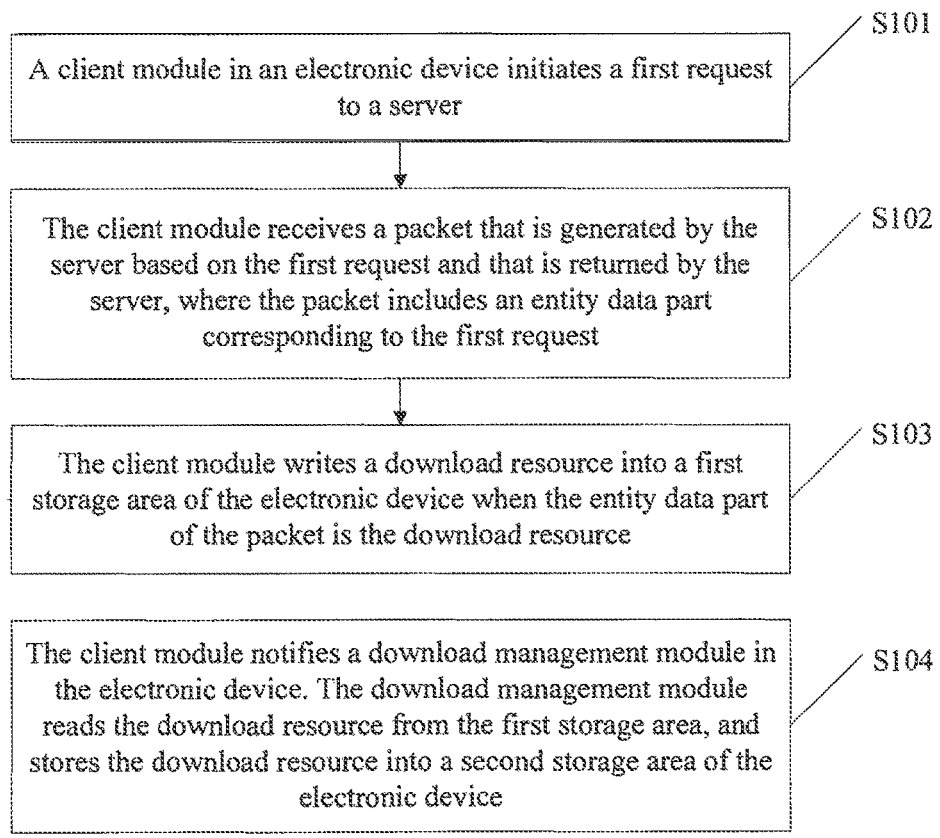
FIG. 2 is a flowchart of a resource download method according to an embodiment of the present disclosure.

Referring to FIG. 2, an embodiment of the present disclosure provides a resource download method, which may be applied to an electronic device shown in FIG. 1, and the resource download method includes the following procedure.

Step S101: A client module in an electronic device initiates a first request to a server.

Further, the first request requests to obtain a resource from the server. In a specific implementation process, the first request may be a "GET request" in the HTTP. Certainly, in another protocol, the first request may also be a request that is in another form and that obtains a resource from a network side. The first request includes a URL of an electronic device resource. The server finds, from the Internet according to the URL, a resource located by the URL.

Step S102: The client module receives a packet that is generated by the server based on the first request and that is returned by the server, where the packet includes an entity data part corresponding to the first request.

Further, the returned packet includes packet header information and the entity data part corresponding to the first request. The server first returns the packet header information of the packet, where two fields "Content-Type" and "Content-Disposition" in the packet header information are used to indicate a resource type of the entity data part, that is, whether the entity data part is a download resource, a web page resource, or the like.

Step S103: The client module writes a download resource into a first storage area of the electronic device when the entity data part of the packet is the download resource.

The electronic device further includes a cache service module, and the client module writes the download resource into the first storage area using the cache service module. In a specific implementation process, the first storage area is a cache area, such as a random access memory (RAM) storage unit.

Further, before receiving the entity data part of the packet, the client module has received the packet header information, and determines, according to the two fields "Content-Type" and "Content-Disposition" in the packet header information, that the entity data part is a download resource. The first request may be a "GET request" in the HTTP. Certainly, in another protocol, the first request may also be a request that is in another form and that is used to obtain a resource from the network side. The client module receives the entity data part, and directly loads the entity data part as a web page when the entity data part of the packet is a web page resource.

In a specific implementation process, to enable the download management module to find a correct download resource in the cache service module, identification information used to identify the download resource is generated according to the URL of the download resource, to index the download resource written into the first storage area. Further, there are multiple manners of generating the identification information used to identify the download resource, and a first implementation manner of generating the identification information is that the URL and an identifier of the cache service module jointly form the identification information. For example, if the URL of the download resource is "http://finance.chinanews.com/it/5983282.shtml," and the identifier of the cache service module is "HC-100A," the identification information that is of the download resource and is in the cache service module may be "http://127.0.0.1/HC-100A/finance.chinanews.com/it/5983282.shtml." Certainly, a person skilled in the art may know another form of forming the identification information according to the cache service module and the URL. A second implementation manner of generating the identification information is that the identification information may also be generated by adding, according to a sequence in which the download resource is written into the first storage area, a sequence number for the download resource, for example, formed identification information "URL1, URL2, URL3 . . . " are sequentially "http://www.so.com//shehui/.shtml . . . 1," "http ://www.so.com/. . . 2," " http ://www.docin.com/search . . . 3," and the like. Certainly, in a specific implementation process, a person skilled in the art may know another form of forming the identification information according to the URL and the sequence in which the download resource is written into the first storage area, and further know that identification information of a location that is of the download resource and is in the cache service module may be indicated by adding other information to the URL, which are not illustrated one by one herein.

Further, to ensure that the download management module can correctly read the entity data part, which is written into the first storage area using the cache service module, a manner in which the client writes the entity data part into the download management module is a blocking mode (writing in the blocking mode means that when the first storage area corresponding to the cache service module is full, another entity data part waits to be written).

Step S104: The client module notifies a download management module in the electronic device. The download management module reads the download resource from the first storage area, and stores the download resource into a second storage area of the electronic device. Further, the second storage area is a storage area different from the first storage area, and may further refer to a read-only memory (ROM) storage area.

Further, step S104 includes the following steps.

Step 1: The client module generates first identification information according to the packet header information and the URL of the download resource.

Further, the client module generates, according to the URL of the download resource, the first identification information that indicates the location that is of the download resource and is in the cache service module and a resource detail, where the resource detail is at least one of resource details, such as a resource data volume, a modified time, and a size, that are represented by at least one field in the packet header information. In a specific implementation process, for a manner of generating, by the client module, the first identification information according to the URL, refer to the foregoing implementation manner of generating the identification information used to index the download resource in the first storage area. For brevity of the specification, details are not described herein again.

Step 2: The client module writes the first identification information into a download record database associated with the download management module, where the first identification information is used by the download management module to obtain a download request corresponding to the download resource.

Step 3: The download management module responds to the download request, and queries, in the cache service module, identification information that matches the first identification information, where the download resource is indexed in the cache service module using second identification information.

Further, when detecting the download request, the download management module retrieves a download record corresponding to the obtained download request, and performs matching between the second identification information in the download record and at least one piece of identification information in the cache service module, to check whether the second identification information matches the first identification information.

Step 4: The download resource is indexed in the cache service module using the second identification information. The download management module reads, from the first storage area using the cache service module, the download resource corresponding to the second identification information when finding the second identification information that matches the first identification information.

Further, the download management module communicates with the cache service module using a socket. In a specific implementation process, when the download management module finds, in the cache service module, the second identification information that matches the first identification information, the cache service module establishes socket communication with the download management module. Then, the download management module initiates, to the cache service module, a request used to request to send the download resource to the download management module. This request for requesting data may be a GET request in the HTTP. The cache service module responds to the GET request that the download management module initiates to the cache service module. The cache service module reads the download resource from the first storage area, and returns the download resource to the download management module. In a specific implementation process, writing between the client module and the download management module is performed in the blocking mode. Correspondingly, the download management module reads the download resource in the blocking mode from the first storage area (reading in the blocking mode means that when the first storage area corresponding to the cache service module is empty, the cache service module waits to read an entity data part that has not been written into the first storage area). In a practical application, an abnormal case such as network disconnection may exist in a download process, therefore, combined use of writing in the blocking mode and reading in the blocking mode can ensure accuracy of an entire process in which a download resource reaches the first storage area from a network side by passing the client module, and then reaches the second storage area from the first storage area by passing the download management module, thereby avoiding interruption or an error of the download resource.

In other approaches, a download resource requested by a client needs to be downloaded using the download management module. So called UserAgent refers to information such as a type and a version number that are of the client or the download management module, an operating system used by the client or the download management module, and a version number of the operating system thereof. However, UserAgent of the client may be different from UserAgent of the download management module. In addition, some existing servers can identify only UserAgent of the client, and therefore can respond to only a request sent by the client. However, when the request is sent again to a same server using the download management module, the server makes no response, which causes a failure in downloading the download resource requested using the client.

However, in the technical solution in this embodiment of the present disclosure, the client module only needs to initiate the first request to the server. Therefore, even if the server does not support UserAgent of the download management module, a problem that the download resource requested using the client cannot be downloaded because the server is incompatible with UserAgent of the client module and that of the download management module at the same time can be avoided, thereby increasing a probability of successful resource download.

Preferably, to further increase a probability of successful resource download in the technical solution in this embodiment of the present disclosure, after the client module writes the identification information into the download management module, the following procedure is further provided in this embodiment of the present disclosure. When the download management module fails to find, in the cache service module, the identification information that matches the first identification information, the URL is determined from the first identification information, where the URL is used by the server to obtain the download resource. The download management module sends a second request according to the URL, where the second request requests the server to return the download resource to the download management module.

Further, the second request may be a GET request in the HTTP, or may be a request that is in another form in another protocol and that is used to request data from the Internet. In addition, according to the foregoing rule of generating the identification information based on the URL, conversely, a person skilled in the field may know how to parse, from the identification information, the required URL of the download resource. For brevity of the specification, details are not described herein again.

Figure 3A:
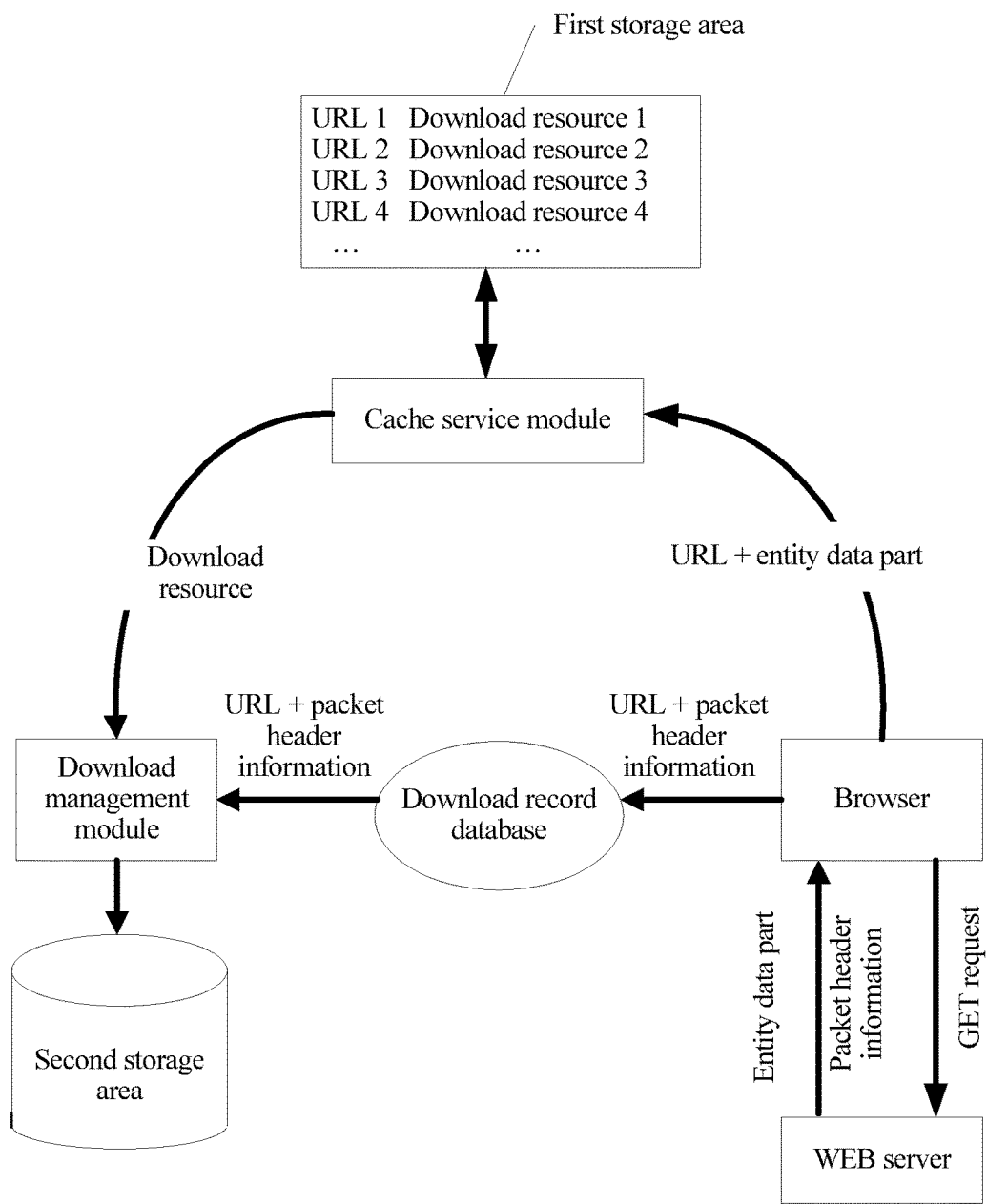
FIG. 3A is a schematic interaction diagram of a preferred implementation manner of a resource download method according to an embodiment of the present disclosure.
Figure 3B:
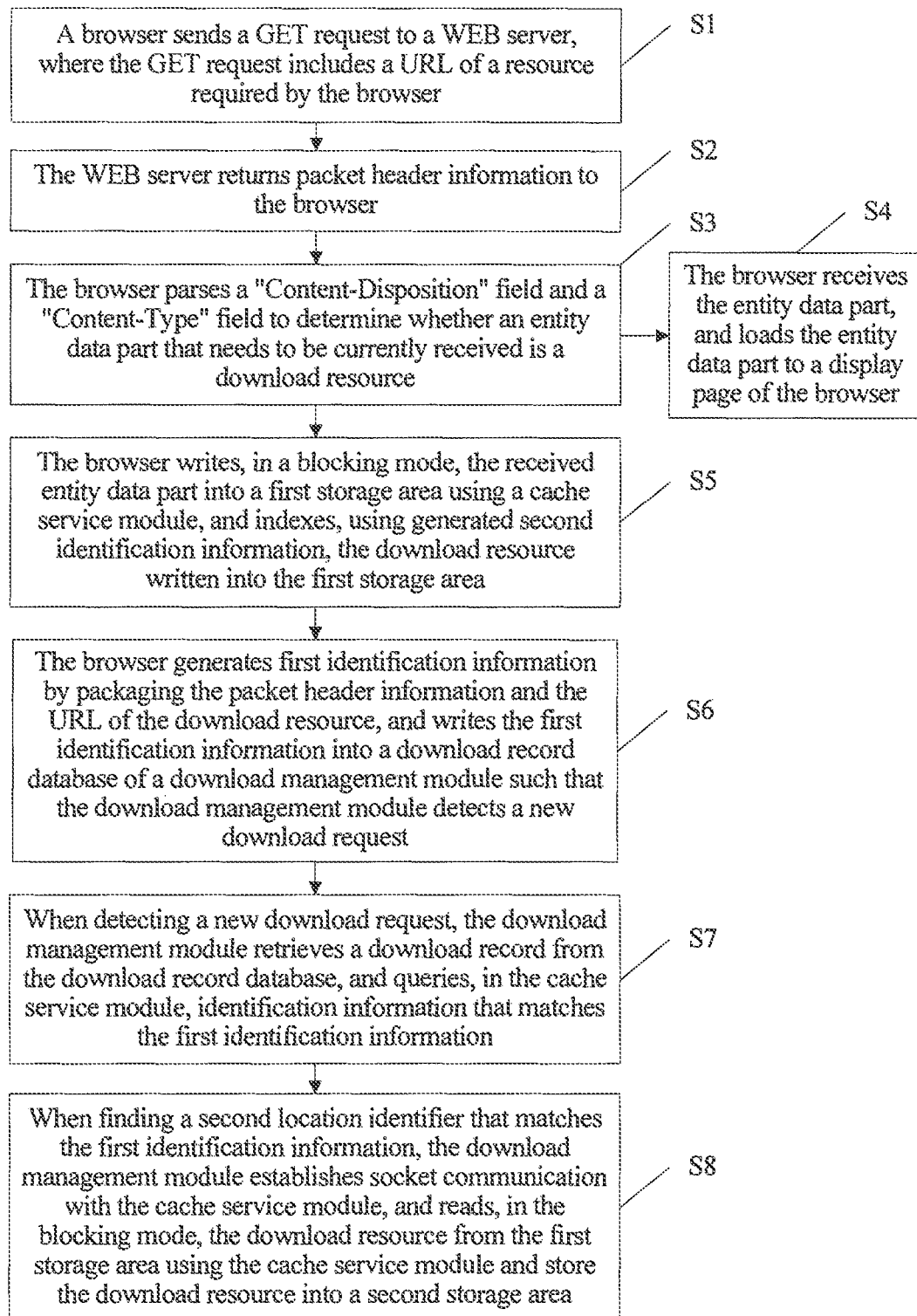
FIG. 3B is an interaction flowchart of a resource download method according to an embodiment of the present disclosure.

In the following, an example in which the client is a browser, the server is a WEB server, and data transmission is performed based on the HTTP describes the technical solution in this embodiment of the present disclosure with reference to FIG. 3A and FIG. 3B. However, the present disclosure is not limited thereto.

Step S1: The browser sends a GET request to the WEB server, where the GET request includes a URL of a resource required by the browser. The GET request requests the WEB server to put, into an entity data part of an HTTP response packet, the resource located by the URL, to return to the browser.

Step S2: The WEB server returns packet header information to the browser.

Step S3: The browser parses a "Content-Disposition" field and a "Content-Type" field to determine whether the entity data part that needs to be currently received is a download resource.

If the entity data part is a web page resource, step S4 is executed.

Step S4: The browser receives the entity data part and loads the entity data part to a display page of the browser.

If the entity data part is a download resource, steps S5 to S8 are executed.

Step S5: The browser writes, in a blocking mode, the received entity data part into a first storage area using a cache service module, and indexes, using generated second identification information, the download resource written into the first storage area.

Step S6: The browser generates first identification information by packaging the packet header information and the URL of the download resource, and writes the first identification information into a download record database of a download management module such that the download management module detects a new download request. In a specific implementation process, S5 and S6 may be two independently executed steps, and there is no sequence in between.

Step S7: When detecting a new download request, the download management module retrieves a download record from the download record database, and queries, in the cache service module, identification information that matches the first identification information.

Step S8: When finding a second location identifier that matches the first identification information, the download management module establishes socket communication with the cache service module, and reads, in the blocking mode, the download resource from the first storage area using the cache service module, and stores the download resource into a second storage area.

Figure 4:
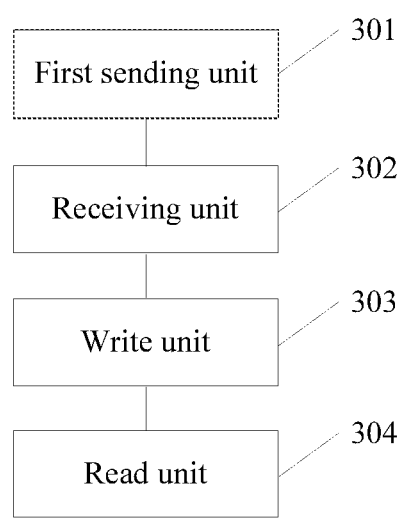
FIG. 4 is a block diagram of an electronic device that implements resource download according to an embodiment of the present disclosure.

Based on a same disclosure idea, an embodiment of the present disclosure further provides an electronic device. Referring to FIG. 4, the electronic device includes a first sending unit 301 configured to control a client module (not shown) in the electronic device to initiate a first request to a server, a receiving unit 302 configured to control the client module to receive a packet that is generated by the server based on the first request and that is returned by the server, where the packet includes an entity data part corresponding to the first request, a write unit 303 configured to control the client module to write the download resource into a first storage area (not shown) of the electronic device when the entity data part of the packet is a download resource, and a read unit 304 configured to control the client module to notify a download management module (not shown) in the electronic device, and control the download management module to read the download resource from the first storage area and store the download resource into a second storage area (not shown) of the electronic device.

Preferably, when the electronic device further includes a cache service module (not shown), the write unit 303 is configured to control the client module to write, using the cache service module, the download resource into the first storage area, and the read unit 304 is configured to control the download management module to read, using the cache service module, the download resource from the first storage area, and control the download management module to store the download resource into the second storage area.

Preferably, the packet further includes packet header information, and the write unit 303 is configured to determine whether the entity data part is a download resource according to the packet header information when the client module receives the packet header information, control the client module to receive the entity data part when the entity data part is a download resource, and control the client module to write, using the cache service module, data of the received entity data part into the first storage area such that the client module writes the download resource into the first storage area.

Preferably, the write unit 303 is further configured to control the client module to generate, according to the packet header information and a URL of the download resource, first identification information, and control the client module to write the first identification information into a download record database associated with the download management module, where the first identification information is used by the download management module to obtain a download request corresponding to the download resource.

Preferably, the read unit 304 is configured to control the download management module to respond to the download request, and query, in the cache service module, identification information that matches the first identification information, where the download resource is indexed in the cache service module using second identification information, and control the download management module to read, from the first storage area using the cache service module, the download resource corresponding to the second identification information when the download management module finds the second identification information that matches the first identification information.

Preferably, the electronic device further includes a determining unit (not shown) configured to, when the download management module fails to find, in the cache service module, the identification information that matches the first identification information, determine the URL from the first identification information, where the URL is used by the server to obtain the download resource, and a second sending unit (not shown) configured to control the download management module to send, according to the URL, a second request to the server, where the second request requests the server to return the download resource to the download management module.

One or more embodiments provided in the present disclosure may implement the following technical effects.

A technical means is used, where a client module in an electronic device initiates a first request to a server. The client module receives a packet that is generated by the server based on the first request and that is returned by the server, where the packet includes an entity data part corresponding to the first request. The client module writes the download resource into a first storage area of the electronic device when the entity data part of the packet is a download resource. The client module notifies a download management module in the electronic device, and the download management module reads the download resource from the first storage area, and stores the download resource into a second storage area of the electronic device. It can been seen that, in the present disclosure, data returned by the server is stored into the first storage area, and the download management module is instructed to retrieve the required entity data part from the first storage area, to implement download of the download resource into the second storage area. During an entire download process, the electronic device only needs to initiate one request to the server, and the server can obtain the download resource by making only one response. Therefore, network load is reduced, and a problem of a traffic waste is avoided.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A resource download method applied to an electronic device, the method comprising:
    initiating, by the electronic device, a first request to a server;
    receiving, by the electronic device from the server, a packet responsive to the first request, the packet comprising an entity data part corresponding to the first request;
    writing, by the electronic device using a cache service module of the electronic device, a resource to be downloaded into a first storage area of the electronic device when the entity data part of the packet includes the resource to be downloaded;
    writing, by the electronic device to a download record database of a download manager in the electronic device, first identification information corresponding to the packet;
    querying, by the download manager, the cache service module for identification information that matches the first identification information;
    when the download manager finds, in the cache service module, the identification information that matches the first identification information:
    reading, by the download manager, the resource to be downloaded from the first storage area; and
    storing, by the electronic device, the resource to be downloaded into a second storage area of the electronic device; and
    after writing the first identification information to the download record database and when the download manager fails to find, in the cache service module, the identification information that matches the first identification information:
    determining, from the first identification information, a uniform resource locator (URL) of the resource to be downloaded; and
    sending, by the download manager to the server according to the URL, a second request that requests the server to return the resource to be downloaded to the download manager.

2. The method of claim 1, wherein reading, by the download manager, the resource to be downloaded from the first storage area comprises reading, by the download manager, the resource to be downloaded from the first storage area using the cache service module.

3. The method of claim 2, wherein the packet further comprises packet header information, and writing, by the electronic device using the cache service module, the resource to be downloaded into the first storage area comprises:
    determining whether the entity data part includes the resource to be downloaded according to the packet header information when the electronic device receives the packet header information;
    receiving, by the electronic device, the entity data part when the entity data part includes the resource to be downloaded; and
    writing, by the electronic device, data of the entity data part into the first storage area using the cache service module when the entity data part includes the resource to be downloaded.

4. The method of claim 3, further comprising generating, by the electronic device, the first identification information according to the packet header information and the URL of the resource to be downloaded.

5. The method of claim 4, wherein the resource. to be downloaded is indexed in the cache service module using second identification information, and reading, by the download manager, the resource to be downloaded from the first storage area using the cache service module comprises reading, by the download manager, the resource to be downloaded corresponding to the second identification information when the download manager finds the second identification information that matches the first identification information.

6. An electronic device, comprising:
    a transmitter configured to control a client module in the electronic device to initiate a first request to a server;
    a receiver coupled to the transmitter and configured to control the client module to receive, from the server, a packet responsive to the first request, the packet comprising an entity data part corresponding to the first request; and
    a processor coupled to the receiver and the transmitter and configured to:
        control the client module to write, using a cache service module of the electronic device, a resource to be downloaded into a first storage area of the electronic device when the entity data part of the packet includes the resource to be downloaded;
        control the client module to write first identification information corresponding to the packet to a download record database of a download manager in the electronic device;
        control the download manager to query the cache service module for identification information that matches the first identification information;
        when the download manager finds, in the cache service module, the identification information that matches the first identification information:
            control the download manager to read the resource to be downloaded from the first storage area; and
            control the download manager to store the resource to be downloaded into a second storage area of the electronic device; and
        when the download manager fails to find, in the cache service module, the identification information that matches the first identification information:
            control the download manager to determine a uniform resource location (URI) of the resource to be downloaded from the first identification information; and control the download manager to send, to the server according to the URL, a second request that requests the server to return the resource to be downloaded to the download manager.

7. The electronic device of claim 6, wherein the processor is configured to control the download manager to read the resource to be downloaded from the first storage area using the cache service module.

8. The electronic device of claim 7, wherein the packet further comprises packet header information, and the processor is further configured to:
control the client module to determine whether the entity data part includes the resource to be downloaded according to the packet header information; and
control the client module to write, using the cache service module, data of the entity data part into the first storage area when the entity data part includes the resource to be downloaded.

9. The electronic device of claim 8, wherein the processor is further configured to control the client module to generate the first identification information according to the packet header information and the URL of the resource to be downloaded.

10. The electronic device of claim 9, wherein the resource to be downloaded is indexed in the cache service module using second identification information, and the processor is configured to control the download manager to read the resource to be downloaded when the download manager finds the second identification information that matches the first identification information.

11. A resource download method applied to an electronic device, the method comprising:
sending, by a web browser in the electronic device, a first request to a server;
receiving, by the web browser from the server, a packet responsive to the first request, the packet comprising packet header information and an entity data part corresponding to the first request;
loading, by the web browser, a web page resource when the entity data part includes the web page resource;
writing, by the web browser, a resource to be downloaded that does not include the web page resource into a first storage area of the electronic device when the entity data part includes the resource to be downloaded;
writing, by the web browser, first identification information corresponding to the resource to be downloaded in a download record database of a download manager of the electronic device;
retrieving, by the download manager from the download record database, the first identification information written to the download record database by the web browser;
using, by the download manager, the first identification information written to the download record database by the web browser to obtain the resource to be downloaded from the first storage area; and
storing, by the download manager into a second storage area of the electronic device, the resource to be downloaded obtained from the first storage area using the first identification information written to the download record database by the web browser.

12. The resource download method of claim 11, wherein the packet includes packet header information, and wherein the method further comprises generating the first identification information according the packet header information and a uniform resource locator (URL) of the resource to be downloaded.

13. The resource download method of claim 12, wherein the download manager uses a cache service module to obtain the resource to be downloaded from the first storage area.

14. The resource download method of claim 13, wherein the packet further comprises packet header information, and wherein writing, by the web browser, the resource to be downloaded into the first storage area comprises:
determining whether the entity data part includes the resource to be downloaded according to the packet header information when the electronic device receives the packet header information;
receiving the entity data part when the entity data part includes the resource to be downloaded; and
writing data of the entity data part into the first storage area using the cache service module when the entity data part includes the resource to be downloaded.

15. The resource download method of claim 14, wherein the resource to be downloaded is indexed in the cache service module using second identification information, and wherein using, by the download manager, the first identification information written to the download record database by the web browser to obtain the resource to be downloaded from the first storage area comprises reading, by the download manager, the resource to be downloaded corresponding to the second identification information when the download manager finds the second identification information that matches the first identification information.

* * * * *

UNITED STATES PATENT AND TRADEMARK OFFICE
CERTIFICATE OF CORRECTION

PATENT NO. : 10,462,258 B2
APPLICATION NO. : 15/503126
DATED : October 29, 2019
INVENTOR(S) : Tao Zhou Page 1 of 1

It is certified that error appears in the above-identified patent and that said Letters Patent is hereby corrected as shown below:

In the Claims

Claim 6, Column 14, Line 65: "location (URI) of" should read "location (URL) of"

Signed and Sealed this
Tenth Day of December, 2019

Andrei Iancu
*Director of the United States Patent and Trademark Office*